(12) United States Patent
Kim et al.

(10) Patent No.: US 9,074,518 B2
(45) Date of Patent: *Jul. 7, 2015

(54) HEAT EXCHANGER FOR VEHICLE

(71) Applicants: Hyundai Motor Company, Seoul (KR); KBAUTOTECH CO., LTD., Asan-si (KR)

(72) Inventors: Jae Yeon Kim, Hwaseong-si (KR); Wan Je Cho, Hwaseong-si (KR); Sangyong Rhee, Samcheok-si (KR); Hae-Seong Choi, Asan-si (KR); Yong Jeong Kim, Ansan-si (KR)

(73) Assignees: HYUNDAI MOTOR COMPANY, Seoul (KR); KBAUTOTECH CO., LTD., Asan-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,524

(22) Filed: Sep. 18, 2013

(65) Prior Publication Data

US 2014/0150739 A1 Jun. 5, 2014

(30) Foreign Application Priority Data

Dec. 5, 2012 (KR) .................. 10-2012-0140590

(51) Int. Cl.
*F01P 11/08* (2006.01)
*F01P 7/16* (2006.01)
*G05D 23/185* (2006.01)
*G05D 23/02* (2006.01)

(52) U.S. Cl.
CPC .............. *F01P 7/165* (2013.01); *F01P 11/08* (2013.01); *G05D 23/1852* (2013.01); *G05D 23/022* (2013.01); *F01P 2060/04* (2013.01)

(58) Field of Classification Search
CPC ....... F28F 3/005; F28F 27/02; F28F 2250/06; F28F 2250/10; F28F 2250/102; F28F 2250/104; F28F 2250/106; F28F 2250/108; F28D 2021/0049; F28D 2021/0082; F28D 2021/0089
USPC ............... 123/41.33; 165/297, 299, 164–167, 165/DIG. 356, DIG. 355, 96, 100, 102, 103; 236/101 C, 101 R
See application file for complete search history.

(56) References Cited

U.S. PATENT DOCUMENTS

| 5,950,715 | A | 9/1999 | Jönsson et al. |
| 7,735,520 | B2 | 6/2010 | Peric |
| 2013/0160972 | A1* | 6/2013 | Sheppard et al. ............... 165/96 |

FOREIGN PATENT DOCUMENTS

| EP | 1 404 995 B1 | 2/2006 |
| JP | 2001-508163 A | 6/2001 |

(Continued)

*Primary Examiner* — Hung Q Nguyen
(74) *Attorney, Agent, or Firm* — Morgan, Lewis & Bockius LLP

(57) ABSTRACT

A heat exchanger for a vehicle includes a heat radiating portion including first and second connecting lines formed alternately by stacking a plurality of plates, and receiving first and second operating fluids therethrough that heat-exchange with each other while circulating unmixed through the respective first and second connecting lines, a bifurcating portion connecting an inflow hole for flowing one of the first and second operating fluids with an exhaust hole for exhausting the one operating fluid to bypass the heat radiating portion according to a temperature of the one operating fluid, and a valve unit mounted at the inflow hole to selectively open one of the connecting lines by expansion and contraction of deformable material so as to flow the operating fluid selectively to the heat radiating portion or the bifurcating portion according to a temperature of the one operating fluid flowing into the inflow hole.

22 Claims, 11 Drawing Sheets

(56) References Cited

FOREIGN PATENT DOCUMENTS

| KR | 10-0876063 B1 | 12/2008 |
| KR | 10-2010-0060638 A | 6/2010 |
| KR | 10-2012-0121159 A | 11/2012 |
| WO | WO 03/006857 A1 | 1/2003 |

* cited by examiner

- - - → Transmission oil

HEAT EXCHANGER FOR VEHICLE

CROSS-REFERENCE TO RELATED APPLICATION

The present application claims priority of Korean Patent Application Number 10-2012-0140590 filed Dec. 5, 2012, the entire contents of which application is incorporated herein for all purposes by this reference.

BACKGROUND OF INVENTION

1. Field of Invention

The present invention relates to a heat exchanger for a vehicle. More particularly, the present invention relates to a heat exchanger for a vehicle which can control temperatures of operating fluids which flows in the heat exchanger.

2. Description of Related Art

Generally, a heat exchanger transfers heat from high-temperature fluid to low-temperature fluid through a heat transfer surface, and is used in a heater, a cooler, an evaporator, and a condenser.

Such a heat exchanger re-uses heat energy or controls a temperature of an operating fluid flowing therein for demanded performance. The heat exchanger is applied to an air conditioning system or a transmission oil cooler of a vehicle, and is mounted at an engine compartment.

Since the heat exchanger is hard to be mounted at the engine compartment with restricted space, studies for the heat exchanger with smaller size, lighter weight, and higher efficiency have been developed.

A conventional heat exchanger controls the temperatures of the operating fluids according to a condition of a vehicle and supplies the operating fluids to an engine, a transmission, or an air conditioning system. For this purpose, bifurcation circuits and valves are mounted on each hydraulic line through which the operating fluids operated as heating medium or cooling medium passes. Therefore, constituent elements and assembling processes increase and layout is complicated.

If additional bifurcation circuits and valves are not used, heat exchanging efficiency cannot be controlled according to flow amount of the operating fluid. Therefore, the temperature of the operating fluid cannot be controlled efficiently.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a heat exchanger for a vehicle having advantages of simultaneously warming up and cooling operating fluids according to temperatures or flow amounts of the operating fluids at a running state or an initial starting condition of the vehicle when the operating fluids are heat exchanged with each other in the heat exchanger.

The present invention has been made in an effort to provide a heat exchanger for a vehicle having further advantages of improving fuel economy and heating performance by controlling temperatures of operating fluids according to condition of the vehicle, and of reducing assembling processes by simplifying a structure of the heat exchanger.

A heat exchanger for a vehicle various embodiments of the present invention may include a heat radiating portion provided with a first connecting line and a second line formed alternately by stacking a plurality of plates, and receiving first and second operating fluids respectively into the first and second connecting lines, the first and second operating fluids heat-exchanging with each other during passing through the first and second connecting lines and the first and second operating fluids supplying into the first and second connecting lines not being mixed with each other and being circulated, a bifurcating portion connecting an inflow hole for flowing one operating fluid of the first and second operating fluids with an exhaust hole for exhausting the one operating fluid, and adapted for the one operating fluid to bypass the heat radiating portion according to a temperature of the one operating fluid, and a valve unit mounted at the inflow hole forming the bifurcating portion, selectively opening or closing one of the connecting lines of the heat radiating portion by expansion or contraction of deformable material filled therein so as to flow the operating fluid selectively to the heat radiating portion or the bifurcating portion according to a temperature of the one operating fluid flowing into the inflow hole.

The each inflow hole and the each exhaust hole may include a first and second inflow hole formed to one surface and the other surface of the heat radiating portion, and a first and second exhaust hole formed to one surface and the other surface of the heat radiating portion facing diagonally with the first and second inflow hole, and respectively connected with first and second inflow hole though the each connecting line respectively within the heat radiating portion.

The valve unit may include an outer case including a fixing member which is inserted into the heat radiating portion corresponding to the first inflow hole, of which a mounting groove is formed lower center portion thereof, and fixed to the other surface of the heat radiating portion, and an insert portion which is formed to an upper portion of the fixing member integrally, at which at least one first opening is formed along length direction thereof corresponding to the connecting line of the heat radiating portion, and at which at least one bypass hole is formed corresponding to the bifurcating portion, a fixing rod which is inserted into the outer case and of which one end is fixed to the mounting groove of the fixing member, a deformable member which is slidably disposed on the fixing rod, and moves up and down on the fixing rod by the expansion or contraction of the deformable material filled therein according to changing of temperature of the operating fluid, an inner case of which at least one second opening is formed along length direction thereof corresponding to the first opening of the outer case, and which is slidably inserted into the outer case, a flange member which is fixed to the lower portion of the inner case therein, and fixed to the lower portion of the deformable member, a stopper fixedly mounted to the upper portion of the outer case, and an elastic member disposed between the deformable member and the stopper so as to supplying elastic force to the deformable member.

The fixing member of the outer case may be fixed to the heat radiating portion though a snap ring.

The outer case may be a cylinder of which the upper end is opened.

The bypass hole and the first opening may be formed apart from each other along the length direction of the outer case.

The first openings may be formed apart from the bypass hole at the lower portion of the outer case along the length direction of the outer case.

The inner case may be a cylinder of which both ends are opened.

The second openings may be formed apart from each other along the length direction of the inner case.

The second openings may be formed misalign along the length direction of the inner case.

The inner case may be moved upward when the deformable member moves upward so that the second opening is positioned at the first opening to open the first opening and close the bypass hole by the inner case.

The inner case may be assembled at the first time as the first opening is closed by the inner case and the second opening is closed by the outer case.

The deformable material filled within the deformable member may be wax material which is expanded or contracted according to the temperature of the operating fluid flowing into the inflow hole.

Flowing holes may be formed to the exterior circumference of the flange member.

The exterior circumference of the flange member may be fixed to the lower interior circumference of the inner case, and a mounting portion formed to the center portion the flange member is connected to the deformable member and is fixed by a fixing ring mounted to the deformable member.

The flange member may be connected to the interior circumference of the inner case.

At least one penetration hole may be formed to the stopper for the operating fluid flowing through the first inflow hole to flow within the valve unit.

The penetration holes may be formed to the center and along circumference of the stopper.

The elastic member may be a coil spring of which one end is biased by the stopper and the other end is biased by the deformable member.

A fixing end may be formed protrude to the stopper for the elastic member to be fixed under the stopper.

A receiving portion, where the stopper is received, may be formed to the upper portion of the outer case.

A ring groove may be formed to the upper and interior circumference of the outer case for a stopper ring to be received thereto for fixing the upper portion of the stopper.

A seal ring may be disposed between the heat radiating portion and the fixing member of the outer case for the operating fluid flowed within the valve unit not to be leaked out of the heat radiating portion.

The bifurcating portion may be protruded from the heat radiating portion for connecting the first inflow hole and the first exhaust hole.

The first inflow hole and the first exhaust hole may be formed to the corners of the heat radiating portion in diagonal direction.

The second inflow hole and the second exhaust hole may be formed the other surface of the heat radiating portion facing diagonally with each other symmetrical to the first inflow hole and the first exhaust hole.

One of operating fluid may be a coolant flowing from a radiator and the other operating fluid may be a transmission oil flowing from an automatic transmission.

The coolant may circulate through the first inflow hole and the first exhaust hole, and the transmission oil circulates through the second inflow hole and the second exhaust hole, and the connecting line may include a first connecting line where the coolant flows there through, and a second connecting line where the transmission oil flows there through.

The bifurcating portion may be provided with a bypass line positioned closed to the first inflow hole and the first exhaust hole and adapted to discharge the coolant flowing into the first inflow hole to the first exhaust hole in addition to the first connecting line.

The heat radiating portion may cause the operating fluid to exchange heat with each other by counterflow of the operating fluids.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
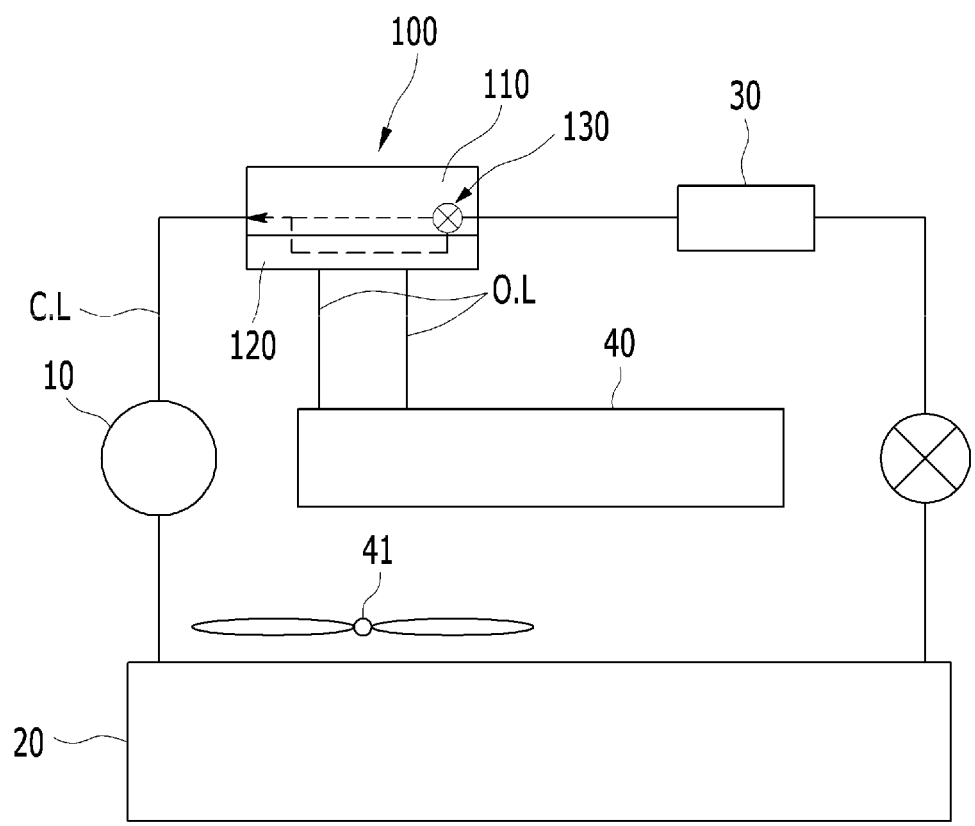
FIG. 1 is a schematic diagram of a cooling system of an automatic transmission to which an exemplary heat exchanger for a vehicle according to the present invention is applied.
Figure 2:
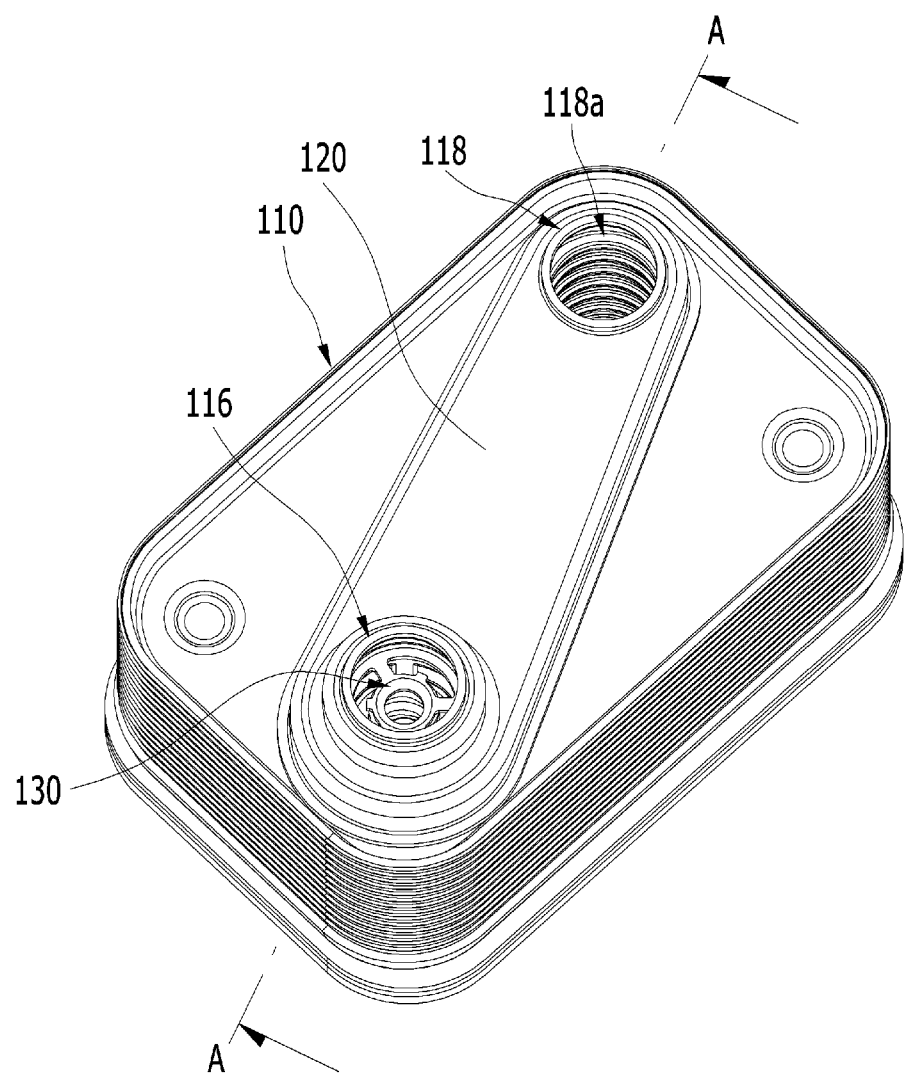
FIG. 2 is a perspective view of an exemplary heat exchanger for a vehicle according to the present invention.
Figure 3:
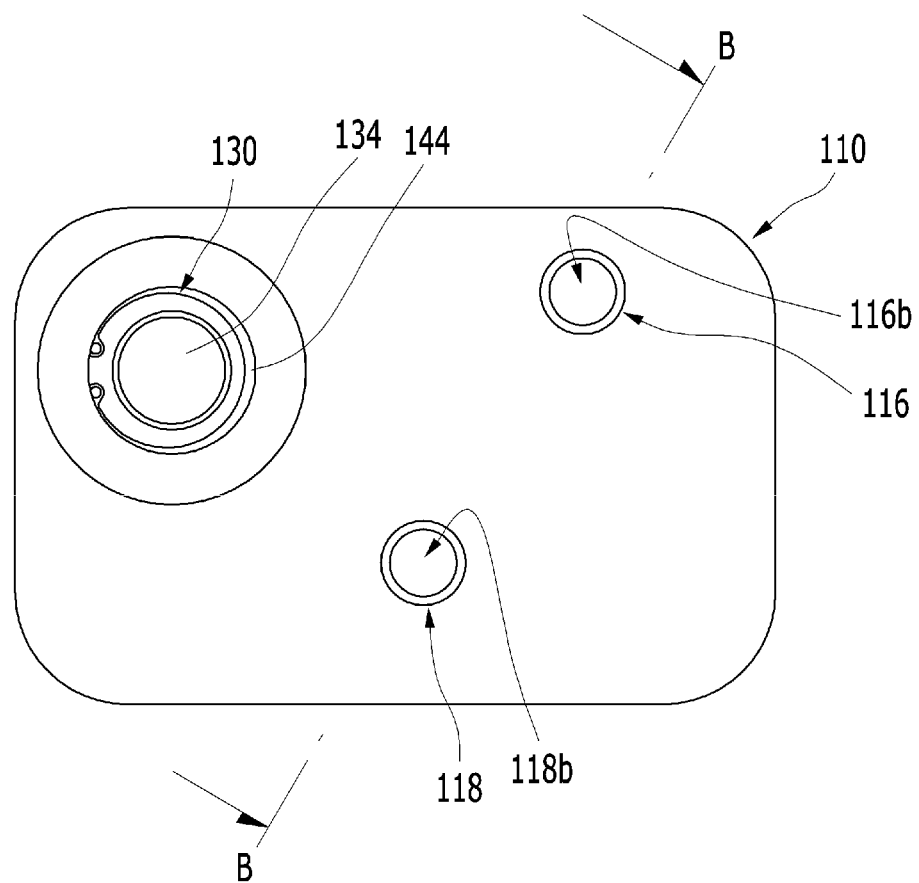
FIG. 3 is a rear view of an exemplary heat exchanger for a vehicle according to the present invention.
Figure 4:
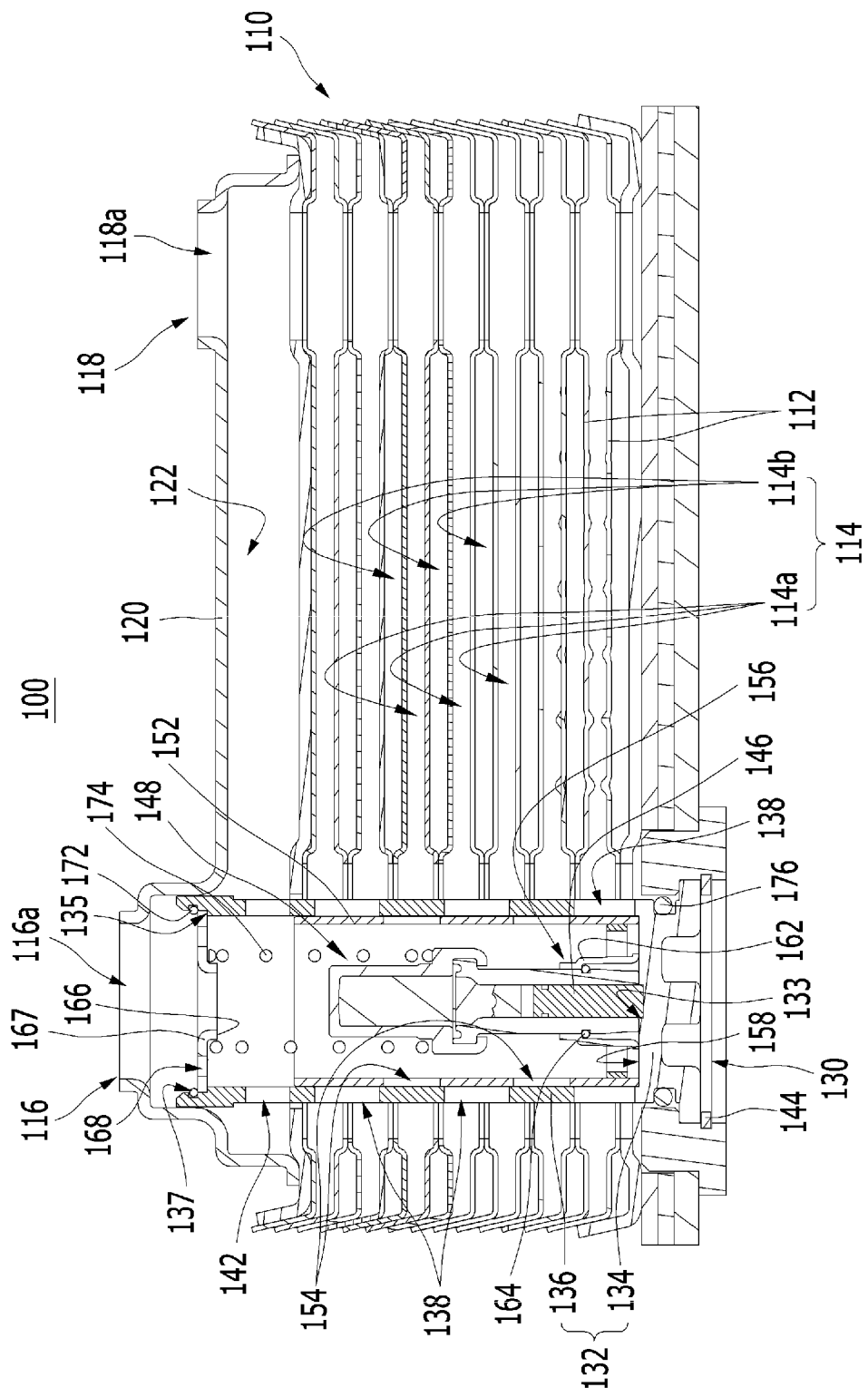
FIG. 4 is a cross-sectional view taken along the line A-A of FIG. 2.
Figure 5:
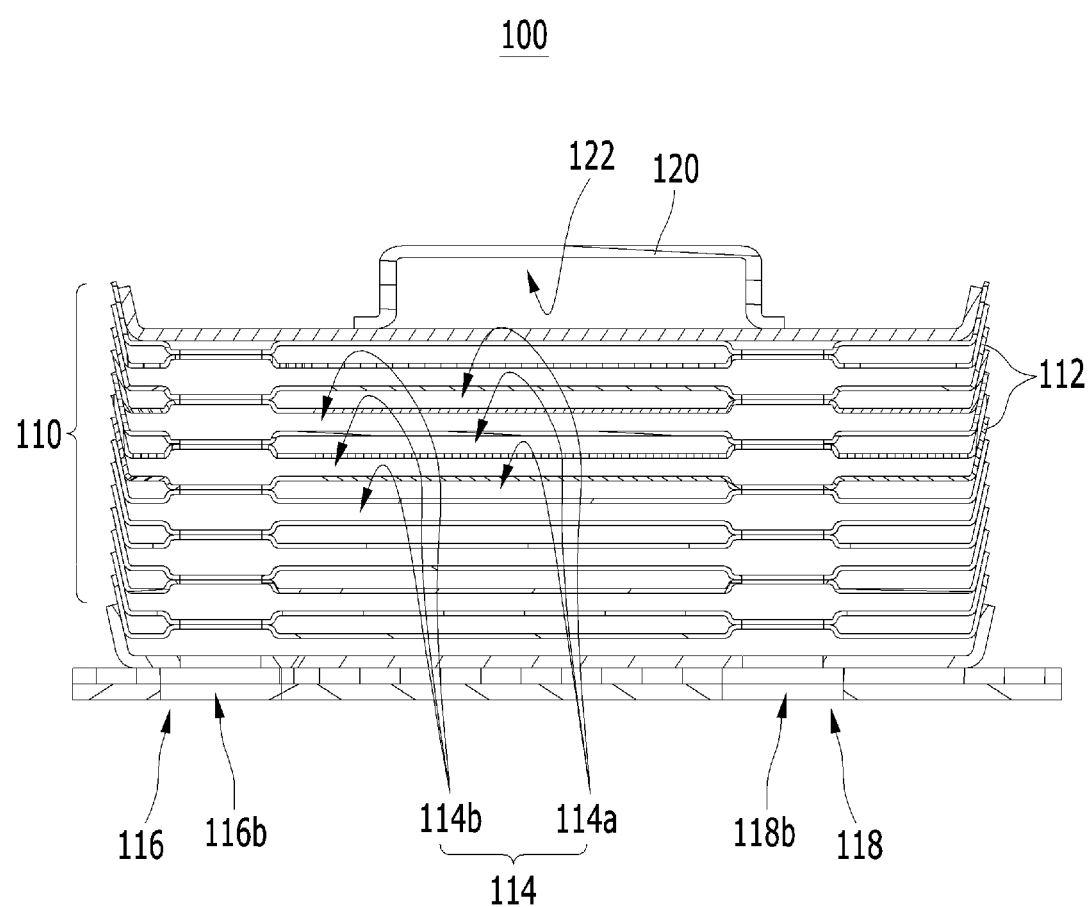
FIG. 5 is a cross-sectional view taken along the line B-B of FIG. 3.
Figure 6:
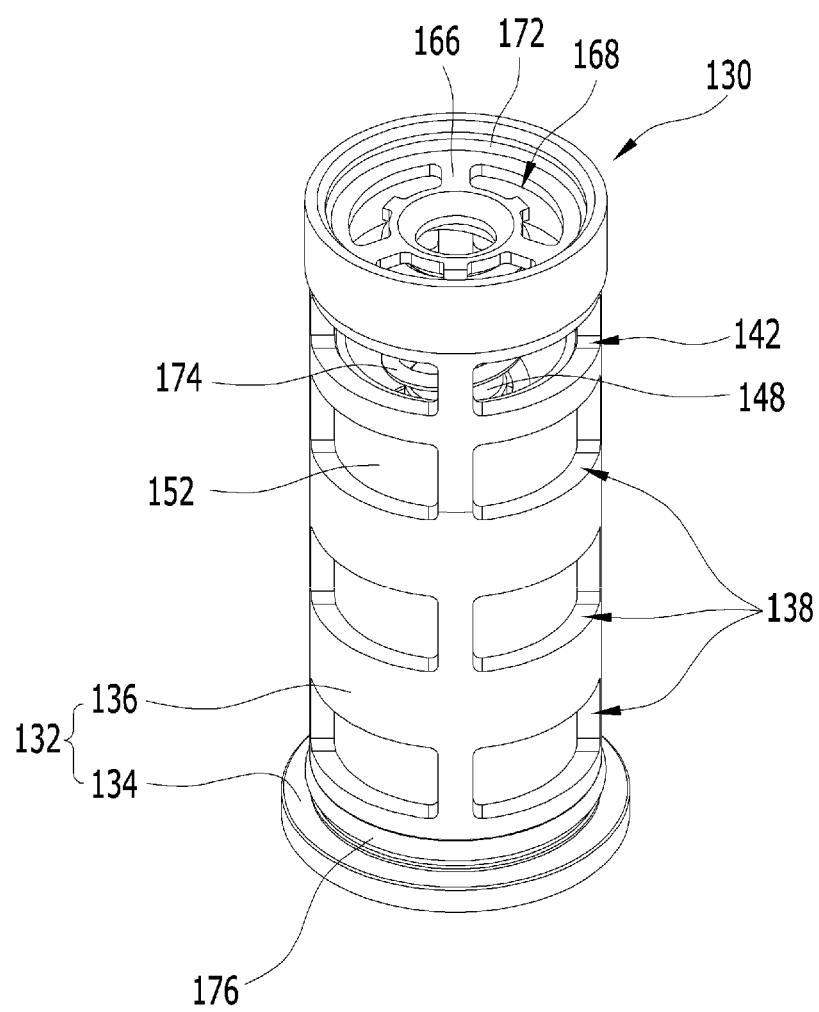
FIG. 6 is a perspective view of an exemplary valve unit used in a heat exchanger for a vehicle according to the present invention.
Figure 7:
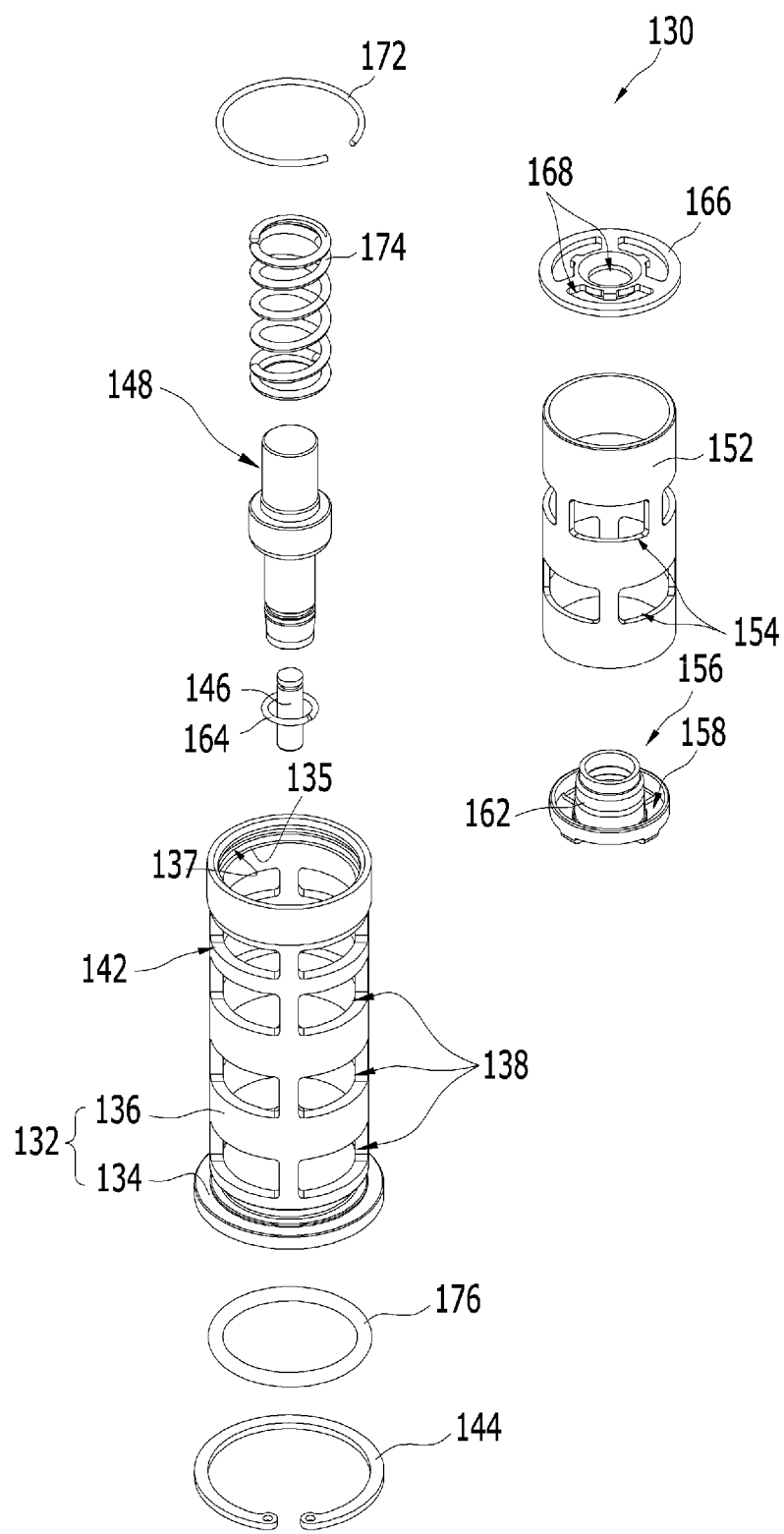
FIG. 7 is an exploded perspective view of an exemplary valve unit according to the present invention.

FIG. 1 is a schematic diagram of a cooling system of an automatic transmission to which a heat exchanger for a vehicle according to various embodiments of the present invention is applied, and FIG. 2 is a perspective view of a heat exchanger for a vehicle according to various embodiments of the present invention. FIG. 3 is a rear view of a heat exchanger for a vehicle according to various embodiments of the present invention, and FIG. 4 is a cross-sectional view taken along the line A-A of FIG. 2. FIG. 5 is a cross-sectional view taken along the line B-B of FIG. 3, and FIG. 6 is a perspective view of a valve unit used in a heat exchanger for a vehicle according to various embodiments of the present invention. FIG. 7 is an exploded perspective view of a valve unit according to various embodiments of the present invention.

Referring to the drawings, a heat exchanger 100 for a vehicle according to various embodiments of the present invention applies to a cooling system of an automatic transmission for a vehicle.

The cooling system of the automatic transmission, as shown in FIG. 1, is provided with a cooling line CL for cooling an engine. A coolant passes through the radiator 20 having a cooling fan 41 through a water pump 10 and is cooled by the radiator 20. A heater core 30 connected to a heating system of the vehicle is mounted at the cooling line CL.

A heat exchanger 100 for a vehicle according to various embodiments of the present invention warms up or cools operating fluids according to temperatures or flow amounts of the operating fluids flowing in at a running state or an initial starting condition of the vehicle when the temperatures of the operating fluids are controlled in the heat exchanger 100 through heat exchange.

For this purpose, the heat exchanger 100 for a vehicle according to various embodiments of the present invention is disposed between the water pump 10 and the heater core 30, and is connected to an automatic transmission 40 through first and second oil lines O.L1 and O.L2.

That is, the operating fluids include a coolant flowing from the radiator 20, a transmission oil flowing from the automatic transmission 40 according to various embodiments. The heat exchanger 100 causes transmission oil to exchange heat with the coolant such that a temperature of the transmission oil is controlled.

The heat exchanger 100 according to the first exemplary embodiment of the present invention, as shown in FIG. 2 and FIG. 3, includes a heat radiating portion 110, a bifurcating portion 120 and a valve unit 130, and each constituent element will be described in detail.

The heat radiating portion 110 is formed by stacking a plurality of plates 112, and a plurality of connecting lines 114 is formed between the neighboring plates 112. The coolant flows through a part of the connecting lines 114 among the plurality of connecting lines 114, and the transmission oil flows through another part of the connecting lines 114 among the plurality of connecting lines 114. Another part of the connecting lines 114 through which the transmission oil flows are disposed between the part of connecting lines 114 and are separated. At this time, the coolant exchanges heat with the transmission oil.

In addition, the operating fluid supplied to the connecting line 114 is not mixed with other operating fluid supplied to other connecting line 114.

Herein, the heat radiating portion 110 causes the coolant to exchange heat with the transmission oil by counterflow of the coolant and the transmission oil.

The heat radiating portion 110 is a heat radiating portion of plate type (or disk type) where the plurality of plates 112 is stacked.

In addition, the bifurcating portion 120 connects one of inflow holes 116 for flowing the operating fluids into the heat radiating portion 110 with one of exhaust holes 118 for discharging the operating fluids from the heat radiating portion 110.

The bifurcating portion 120 is configured for the operating fluid to detour by the valve unit 130 operated according to the temperature of the operating fluid.

The inflow holes 116 include a first and a second inflow hole 116a and 116b formed at both sides of a surface of the heat radiating portion 110.

The exhaust holes 118 include a first and a second exhaust hole 118a and 118b formed to one surface and the other surface of the heat radiating portion 110 facing diagonally with the first and second inflow hole 116a and 116b, and respectively connected with first and second inflow hole 116a and 116b through the each connecting line 114 respectively within the heat radiating portion 110.

The first inflow hole 116a and the first exhaust hole 118a are formed at corner portions of the surface of the heat radiating portion 110 diagonally.

The second inflow hole 116b and the second exhaust hole 118b are formed at corner portions of the surface of the heat radiating portion 110 facing diagonally with each other symmetrical to the first inflow hole 116a and the first exhaust hole 118b.

The bifurcating portion 120 connects the first inflow hole 116a with the first exhaust hole 118a, and is protruded from the surface of the heat radiating portion 110.

According to the present exemplary embodiment, the coolant circulates through the first inflow hole 116a and the first exhaust hole 118a, and the transmission oil circulates through the second inflow hole 116b and the second exhaust hole 118b.

Connecting ports may be mounted respectively at the first and second inflow holes 116a and 116b and the first and second exhaust holes 118a and 118b, and are connected to the radiator 20 and the automatic transmission 40 through connecting hoses connected to the connecting ports.

According to the present exemplary embodiment, the connecting line 114, as shown in FIG. 4 and FIG. 5, includes first and second connecting lines 114a and 114b, and will be described in detail.

Herein, the bifurcating portion 120 includes a bypass line 122 formed at a position close to the first inflow hole 116a and the first exhaust hole 118b. The bypass line 122 is adapted to exhaust the coolant flowing into the first inflow hole 116a directly to the first exhaust hole 118a, not passing through the first connecting line 114a.

In the present exemplary embodiment, although it is described as the coolant inflowing through the first inflow hole 116a and the first exhaust hole 118a flows through the first connecting line 114a, and selectively operates the valve unit 130, and the transmission oil inflowing through the second inflow hole 116b and the second exhaust hole 118b flows through the second connecting line 114b, however it is not limited thereto. On the contrary, the coolant and the transmission oil may be replaced each other.

In addition, the valve unit 130 is mounted at the heat radiating portion 110 corresponding to the first inflow hole 116a forming the bifurcating portion 120, and flows the coolant to the heat radiating portion 110 or to the bypass line 122 according to the temperature of the coolant.

The valve unit 130, as shown in FIG. 6 and FIG. 7, includes an outer case 132, a fixing rod 146, a deformable member 148, an inner case 152, a flange member 156, a stopper 166 and an elastic member 174, and will be described in detail.

The outer case 132 is inserted into the heat radiating portion 110 corresponding to the first inflow hole 116a.

The outer case 132 includes a fixing member 134 of which a mounting groove 133 is formed lower center portion thereof, is fixed to the other surface of the heat radiating portion 110, and an insert portion 136 that is formed to an upper portion of the fixing member 134 integrally. One will appreciate that such integral components may be monolithically formed.

The insert portion 136 is shaped as a cylinder shape, a plurality of the first opening 138 is formed to exterior circumference of the insert portion 136 corresponding to the first connecting line 114a of the heat radiating portion 110, and at least at least one bypass hole 142 is formed to exterior circumference of the insert portion 136 corresponding to the bypass line 122 of the bifurcating portion 120.

The bypass holes 142 and the first openings 138 are formed apart from each other along the length direction of the outer case 132 with a predetermined angle. In the present exemplary embodiment, 4 bypass holes 142 and first openings 138 are formed with 90° from adjacent the bypass holes 142 or the first openings 138 along the exterior circumference of the insert portion 136, but is not limited thereto.

The first openings 138 are formed apart under the bypass holes 142 and along the length direction of the outer case 132.

The fixing member 134 of the outer case 132 is fixed to the heat radiating portion 110 through a snap ring 144 that is mounted at the other surface of the heat radiating portion 110.

The outer case 132 is a cylinder of which the upper end is opened.

In the present exemplary embodiment, the fixing rod 146 is inserted into the outer case 132, and a lower end of which is fixedly mounted to the mounting groove 133 of the fixing member 134.

The deformable member 148 is connected to an upper portion of the fixing rod 146, the position of the deformable member 148 is changed up and down on the fixing rod 146 according to expansion or contraction of the deformable material filled within the deformable member 148 affected by the temperature of the operating fluid.

The deformable material may be a wax material that is expandable and contractible according to the temperature of the operating fluid.

The wax material or wax element is a thermal expansion material according to the temperature.

The deformable member 148 is an assembly filled with the wax material. When the volume of the wax material is changed according to the temperature, the deformable member 148 is moved up or down on the fixing rod 146 without changing of the appearance.

If the coolant with relatively high temperature flows through the first inlet 116a, the deformable member 148, by the expansion of the wax material filled therein, moves upward on the fixing rod 146.

On the contrary, if the coolant with relatively low temperature flows through the first inlet 116a, the deformable member 148, by the contraction of the wax material filled therein, moves downward on the fixing rod 146.

If the coolant with relatively low temperature flows through the first inlet 116a when the deformable member 148 positions at initial state, the deformable member is not moved up or downward because the volume of the wax material is not changed.

In the present exemplary embodiment, at least one second opening 154 is formed to the inner case 152 along the length direction thereof corresponding to the first opening 138 of the outer case 132, and the inner case 152 is slidable within the outer case 132.

The inner case 152 is a cylinder shape of which both ends are opened.

The second openings 154 are formed misalign along the length direction of the inner case 152 corresponding to the first opening 138 with a predetermined angle from each other.

In the drawings, 4 second openings 154 are formed to an upper and lower portion of the exterior circumference of the inner case 152 with 90° from adjacent the second openings 154, but is not limited thereto.

In the present exemplary embodiment, the flange member 156 is connected to the interior circumference of the inner case 152, and a center of which is fixed to the lower portion of the deformable member 148.

The flange member 156 may be integrally formed with the inner case 152, is slidable within the outer case 132, and is fixed to the lower portion of the deformable member 148. One will appreciate that such integral components may be monolithically formed.

Flowing holes 158 may be formed to the exterior circumference of the flange member 156 with a predetermined angle.

For example, 4 flowing holes 158 may be formed to the exterior circumference of the flange member 156 with 90°, and the operation fluid flowing through the first inflow hole 116a may flow to the first connecting line 114a of the heat radiating portion 110 via the inner side of the inner case 152, the flowing hole 158 and the second opening 154.

The exterior circumference of the flange member 156 is fixed to the interior circumference of the inner case 152, and the mounting portion 162 formed to the center thereof is fixed to the deformable member 148 through the fixing ring 164.

In the present exemplary embodiment, the inner case 152 moves upward with deformable member 148 within the outer case 132 by the flange member 156 when the deformable member 148 moves upward.

In this case, the second openings 154 of the inner case 152 is positioned corresponding to the first openings 138 so as to open the first openings 138 and the upper portion of the inner case 152 closes the bypass hole 142.

The inner case 152 may be assembled at the first time as the second opening 154 is closed by a closed section between the first openings 138 and thus the first openings 138 are closed, and the upper portion of the inner case 152 is positioned under the bypass hole 142 so as to open the bypass hole 142.

In the present exemplary embodiment, the stopper 166 is fixed to the upper end of the outer case 132.

At least one penetration hole 168 is formed to the stopper 166 for the operating fluid flowing through the first inflow hole 116a to flow within the valve unit 130 to be supplied to the deformable member 148.

In the drawings, the penetration holes 168 are formed to the center of the stopper 166 and 4 penetration holes 168 are formed along circumferential direction with 90° but, it is not limited thereto.

A receiving portion 135, where the stopper 166 is received, is formed to the upper portion of the outer case 132.

The receiving portion 135 is formed along the interior circumference of the outer case 132 and protrudes toward the center of the outer case 132.

A ring groove 137 is formed to the upper and interior circumference of the outer case 132 for a stopper ring 172 to be received thereto for fixing the upper portion of the stopper 166.

The stopper 166 is disposed to the receiving portion 135 of the outer case 132 and is fixed by the stopper ring 172 mounted to the ring groove 137.

The elastic member 174 is interposed between the deformable member 148 and the stopper 166 and supplies elastic force to the deformable member 148.

One end of the elastic member 174 is supported by the stopper 166 and the other end thereof is supported by the deformable member 148 and the elastic member 174 may be a coil spring.

Thus, the elastic member 174 is compressed when the deformable member 148 moves upward on the fixing rod 146.

On the contrary, when the deformable member 148 moves downward, the elastic member 174 supplies elastic force to the deformable member 148 so as for the deformable member 148 rapidly returns to the original position.

A fixing end 167 is formed protrude to the stopper 166 for the elastic member 174 to be fixed under the stopper 166.

The fixing end 167 supports the elastic member 174 stably.

In the drawings, each four first and second openings 138 and 154, bypass holes 142, flowing holes 158 and penetration holes 168 are formed with 90° along circumferential direction. However it is not limited thereto, on the contrary, positions and numbers of each opening 138 and 154, bypass hole 142, flowing hole 158 and penetration hole 168 may be various.

A seal ring 176 may be disposed between the heat radiating portion 110 and the fixing member 134 of the outer case 132 for the operating fluid, for example the coolant, flowed within the valve unit 130 not to be leaked out except for the openings 138 and 154 and the bypass holes 142 of the valve unit 130, and also not to be leaked out between the heat radiating portion 110 and the fixing member 134.

Figure 8:
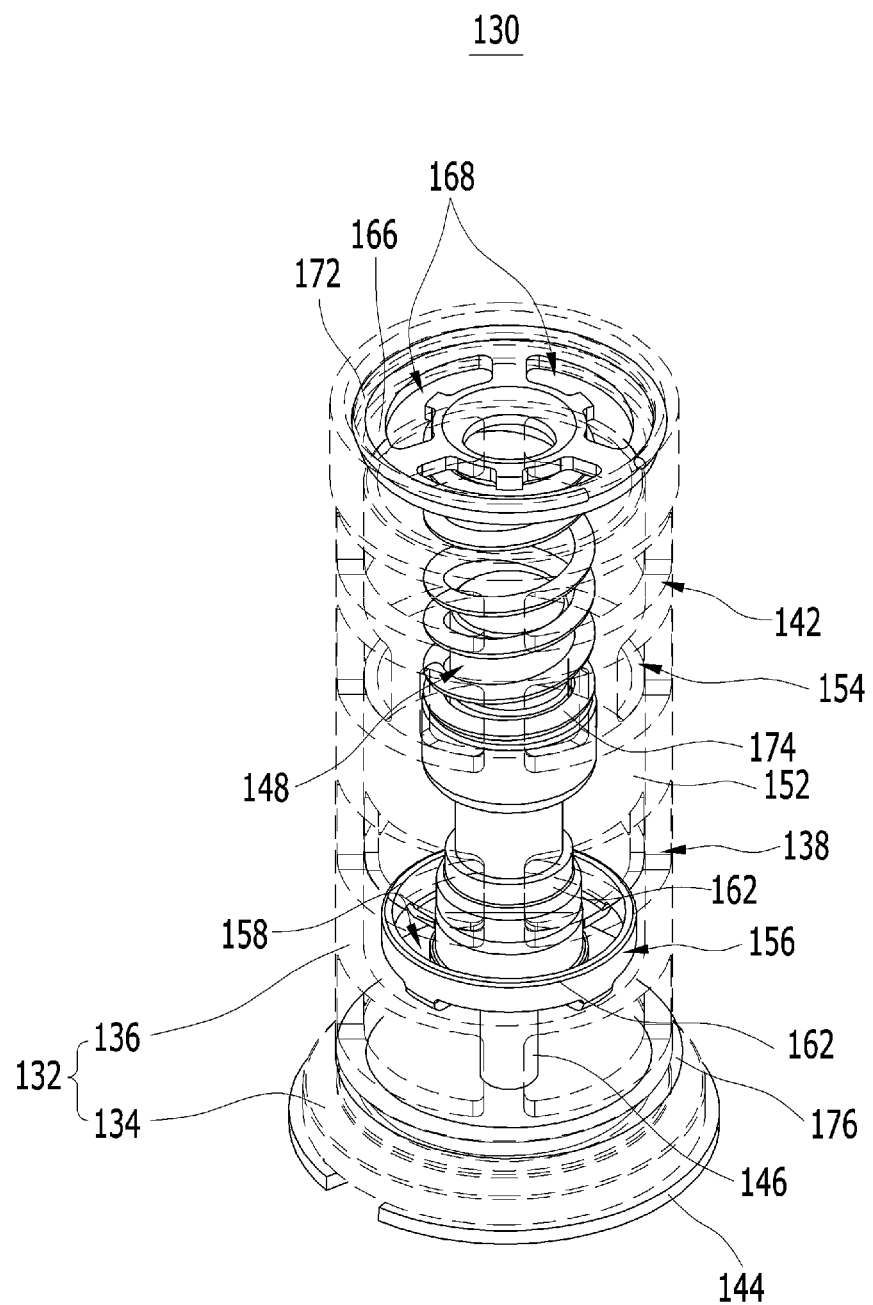
FIG. 8 is a drawing for describing operation of an exemplary valve unit for a heat exchanger according to the present invention.

FIG. 8 is a drawing for describing operation of a valve unit for a heat exchanger according to various embodiments of the present invention.

As shown in FIG. 8, the operating fluid with high temperature flows through the first inflow hole 116a and the penetration holes 168 of the stopper 166 and into the inside of the outer case 132 and the inner case 152.

Then, the deformable member 148 moves upward on the fixing rod 146 by the expansion of the wax material within the deformable member 148.

Thus, the flange member 156 fixed to the lower portion of the deformable member 148 moves upward together with the deformable member 148. Simultaneously, the inner case 152 slides upward with the flange member 156 within the outer case 132.

In this case, the elastic member 174 is compressed and simultaneously, the bypass hole 142 is closed by the inner case 152.

The second openings 154 are positioned corresponding to the first openings 138 so as to be opened, thus the coolant flows through the first connecting line 114a.

If the operating fluid with temperature below a predetermined temperature flows into the first inflow hole 116a, the deformable member 148 moves downward on the fixing rod 146.

In this case, the elastic member 174 supplies elastic force to the deformable member 148 so as for the deformable member 148 rapidly to return to the original position.

Then the inner case 152 moves downward together with the flange member 156 fixed to the deformable member 148, and thus the bypass holes 142 are opened and simultaneously the first openings 138 are closed.

Hereinafter, functions and operations of the heat exchanger 100 according to various embodiments of the present invention will be described.

Figure 9:
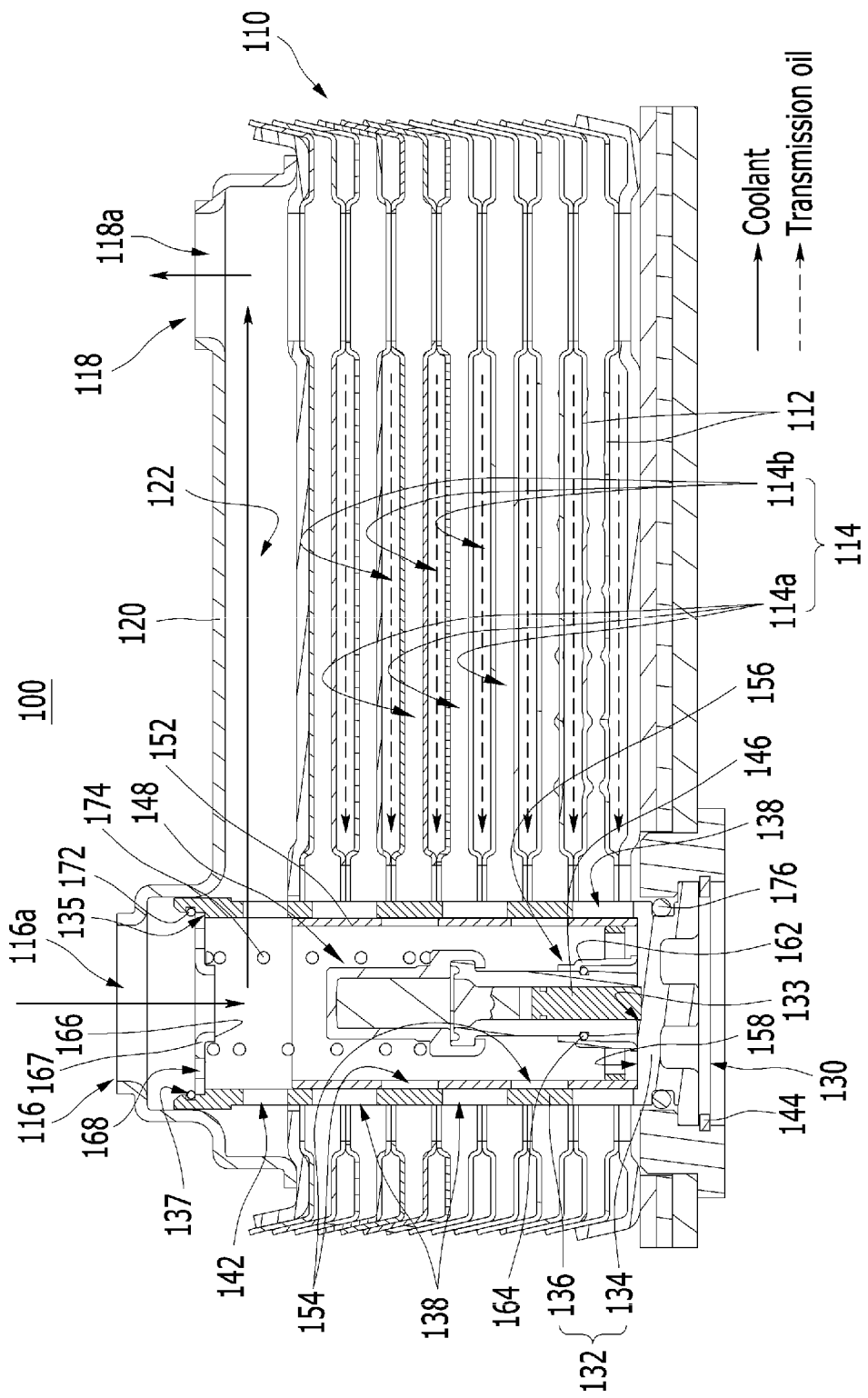
FIGS. 9, 10 and 11 are drawings for describing operation of an exemplary heat exchanger for a vehicle according to the present invention.
Figure 10:
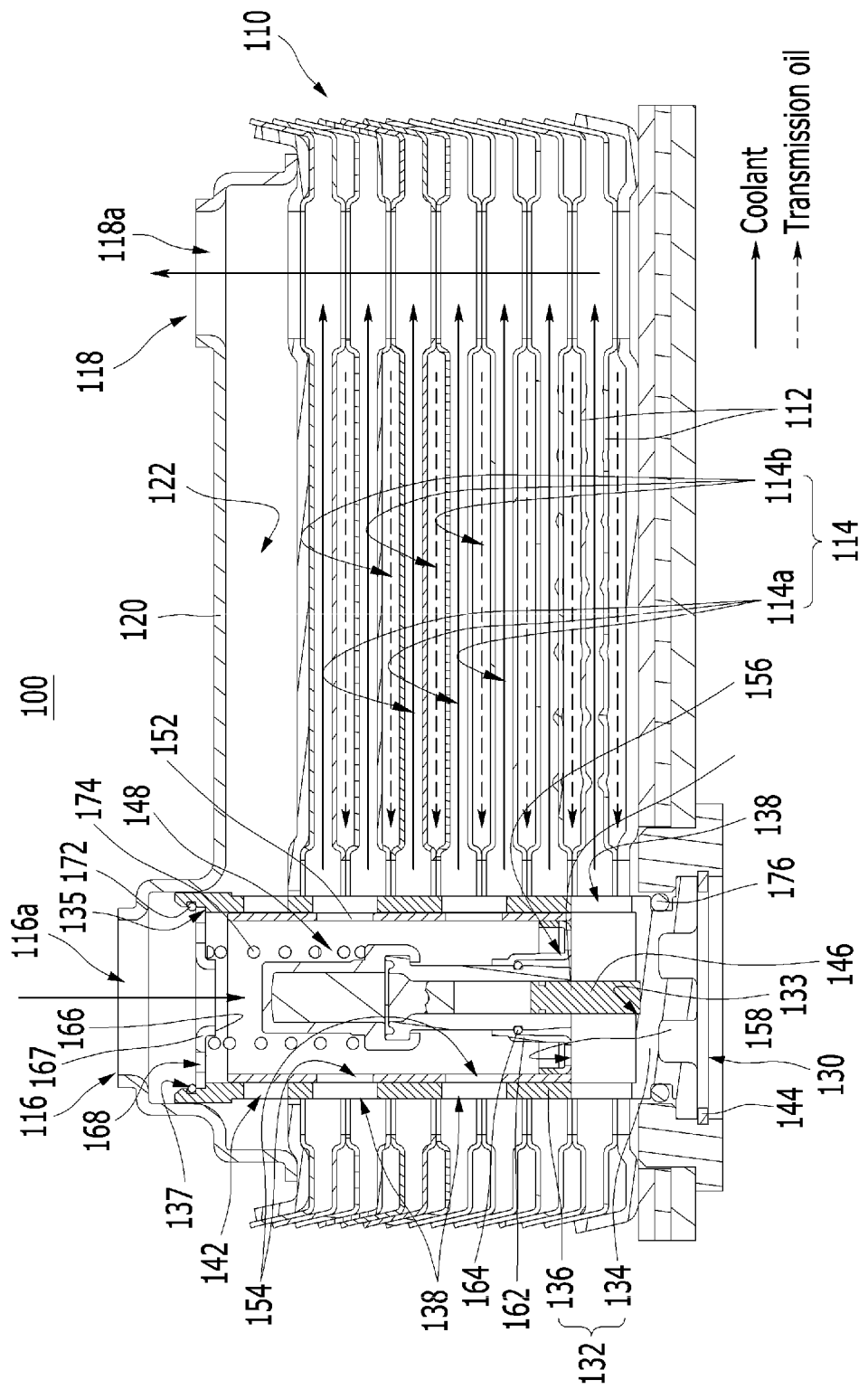
Figure 11:
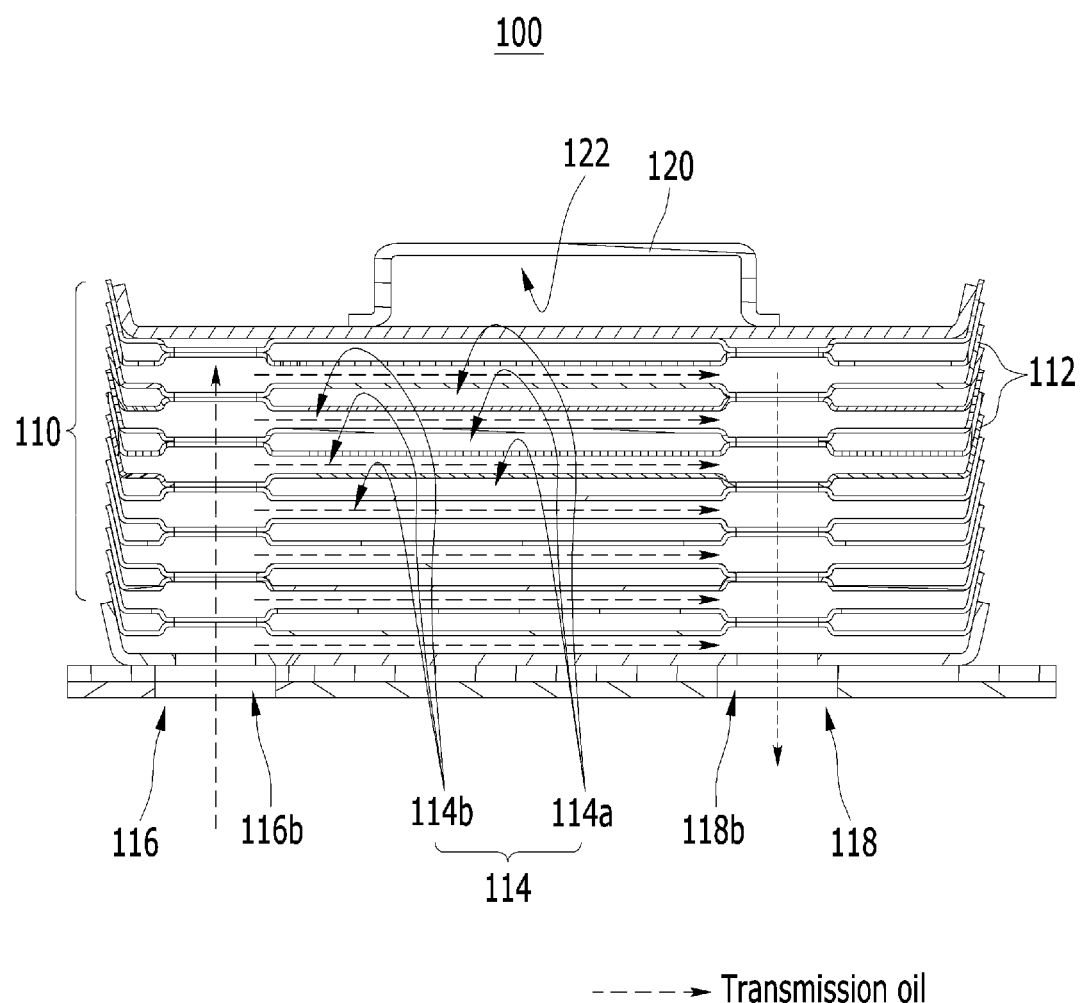

FIG. 9 to FIG. 11 are drawings for describing operation of a heat exchanger for a vehicle according to various embodiments of the present invention.

If the temperature of the coolant flowing into the first inflow hole 116a is lower than a predetermined temperature, as shown in FIG. 9, the deformable member 148 maintains the initial position.

Thus the inner case 152 also maintains the initial position, and the bypass hole 142 of the outer case 132 is opened.

As described above, the first opening 138 and the second opening 154 are closed by the inner case 152 and the outer case 132 respectively.

Thus, the coolant flowing into the valve unit 130 is prevented from flowing into the first connecting line 114a.

The coolant flows from the valve unit 130 through the bypass hole 142 and the bypass line 122 formed by the bifurcating portion 120, and flows out through the first exhaust hole 118a.

Accordingly, the coolant does not flow into the first connecting line 114a of the heat radiating portion 110. So the coolant does not exchange heat with the transmission oil flowed through the second inflow hole 116b and the second connecting line 114b of the heat radiating portion 110.

If the transmission oil should be warmed up according to a condition or a mode of the vehicle such as a running state, an idle mode, or an initial starting, the bypass line 122 prevents the coolant of low temperature from flowing into the first connecting line 114a. Therefore, it is prevented that the temperatures of the transmission oil is lowered through heat exchange with the coolant.

If the temperature of the coolant, on the contrary, is higher than the predetermined temperature, the deformable member 148 of the valve unit 130 moves upward on the guide rod 138 as shown in FIG. 10 by the coolant flowing through the penetration hole 168 of the stopper 166.

In this case, the flange member 156 moves upward together with the deformable member 148, and the inner case 152 slides upward with the flange member 156 within the outer case 132.

Referring to FIG. 8, the bypass hole 142 are closed by the upper portion of the inner case 152, and the second openings 154 are positioned corresponding to the first openings 138.

Thus, the first and second openings 138 and 154 communicates the inside of the inner case 152 with the outside of the outer case 132, so the valve unit 130 is opened.

Then the coolant flowing into the valve unit 130, at a state that flowing into the bypass line 122 is prevented by closing the bypass hole though the inner case 152, flows out through the first and second openings 138 and 154, the first connecting line 114a, the heat radiating portion 110 and the first exhaust hole 118a.

A part of the coolant flowing into the first inflow hole 116a, not flowing into the valve unit 130, may flow through the bypass line 122 and flow out through the first exhaust hole 118a with the coolant flowing through the first connecting line 114a.

The coolant passing through the first connecting line 114a of the heat radiating portion 110 and the transmission oil passing through the second inflow hole 116b and the second connecting line 114b exchange heat within the heat radiating portion 110 so that the temperatures thereof may be controlled.

The coolant and the transmission oil flows different direction or opposition direction and exchange heat with each other because the first and second inflow hole 116a and 116b are formed to one surface and the other surface of the heat radiating portion 110 in diagonal direction. Therefore, the transmission oil and the engine oil exchange heat with the coolant more efficiently.

Meanwhile, as shown in FIG. 11, the transmission oil flows from the automatic transmission 40 into the second inflow hole 116b formed to the other surface of the heat radiating portion 110, passes the second connecting line 114b, and flows out through the second exhaust hole 118b so as to selectively exchange heat with the coolant by the operation of the valve unit 130.

Therefore, the transmission oil, the temperatures of which is raised by operation of a torque converter, is cooled through heat exchange with the coolant in the heat radiating portion 110 and is then supplied to the automatic transmission 40.

That is, since the heat exchanger 100 supplies the cooled transmission oil to the automatic transmission 40 rotating with a high speed, occurrence of slip in the automatic transmission 40 is prevented.

The deformable member 148 moves upward or downward on the fixing rod 146 according to the temperature of the coolant so as to adjust the position of the inner case 152 and simultaneously closes or opens each opening 138 and 154, thus the coolant flows through the bypass hole 142, or the first and second openings 138 and 154. Accordingly, the heat exchanger 100 according to various embodiments of the present invention may control flowing of the coolant passing through the heat exchanger 100.

If the heat exchanger 100 according to various embodiments of the present invention is applied, the operating fluids can be warmed up and cooled simultaneously by using the temperatures of the operating fluids at the running state or the initial starting condition of the vehicle. Therefore, the temperatures of the operating fluids can be controlled efficiently.

Also, the heat exchanger 100 may improve fuel economy and heating performance by controlling temperatures of the operating fluids according to condition of the vehicle, and of reducing assembling processes by simplifying a structure of the heat exchanger.

The valve unit 130 filled with the deformable material such as the wax material which may be expanded or contracted according to the flowed operating fluid may selectively supplies the coolant to the bifurcating portion 120 or the heat radiating portion 110. Therefore, constituent elements can be simplified and production cost may be curtailed. In addition, weight may be reduced.

Since additional bifurcation circuits are not needed, production cost may be curtailed, workability and utilization of space in a small engine compartment may be improved, and a layout of connecting hoses may be simplified.

If the operating fluid is the transmission oil in the automatic transmission 40, hydraulic friction at a cold starting may be lowered due to fast warm up. In addition, slip may be prevented and durability may be maintained at driving due to excellent cooling performance. Therefore, fuel economy and durability of the transmission may be improved.

It is exemplified in this specification that the coolant and the transmission oil is used as the operating fluids, but the operating fluids are not limited to these. All the operating fluids that require warming up or cooling can be used.

In addition, the heat exchanger according to various embodiments may further include covers and brackets that prevent damage of the heat exchanger and other components or that are used for fixing the heat exchanger to other components or the engine compartment.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger for a vehicle, comprising:
a heat radiating portion including a first connecting line and a second connecting line formed alternately by a plurality of stacked plates, and receiving first and second operating fluids, respectively, the first and second operating fluids heat-exchanging with each other during circulation through the first and second connecting lines, wherein the first and second operating fluids supplying into the first and second connecting lines do not mix with each other during circulation; and
a bifurcating portion connecting an inflow hole for flowing one of the first and second operating fluids with an exhaust hole for exhausting the one operating fluid, to direct the one operating fluid to bypass the heat radiating portion according to a temperature of the one operating fluid;
wherein the bifurcating portion includes a valve unit mounted at the inflow hole, selectively opening and closing one of the connecting lines of the heat radiating portion by expansion and contraction of a deformable material therein to direct the operating fluid selectively to the heat radiating portion or the bifurcating portion according to the temperature of the one operating fluid,
wherein the inflow hole includes first and second inflow holes formed in first and second surfaces of the heat radiating portion,
wherein the exhaust hole includes first and second exhaust holes formed in the first and second surfaces of the heat radiating portion facing diagonally with the first and second inflow holes, and respectively connected with the first and second inflow holes through the respective connecting lines respectively within the heat radiating portion, and
wherein the valve unit comprises:
an outer case including a fixing member inserted into the heat radiating portion corresponding to the first inflow hole and having a mounting groove formed in a lower center portion thereof, and fixed to the second surface of the heat radiating portion, and an insert portion formed to an upper portion of the fixing member integrally, having at least one first opening formed along length direction thereof corresponding to the connecting line of the heat radiating portion, and having at least one bypass hole formed corresponding to the bifurcating portion;
a fixing rod inserted into the outer case and of which one end is fixed to the mounting groove of the fixing member;
a deformable member slidably disposed on the fixing rod, and moves up and down on the fixing rod by the expansion or contraction of the deformable material filled therein according to changing of temperature of the operating fluid;
an inner case of which at least one second opening is formed along length direction thereof corresponding to the first opening of the outer case, and slidably inserted into the outer case;
a flange member fixed to the lower portion of the inner case therein, and fixed to the lower portion of the deformable member;
a stopper fixedly mounted to the upper portion of the outer case; and
an elastic member disposed between the deformable member and the stopper so as to supplying elastic force to the deformable member.

2. The heat exchanger of claim 1, wherein the fixing member of the outer case is fixed to the heat radiating portion by a snap ring.

3. The heat exchanger of claim 1, wherein the outer case is a cylinder of which an upper end is opened.

4. The heat exchanger of claim 1, wherein the bypass hole and the first opening are formed apart from each other along the length direction of the outer case.

5. The heat exchanger of claim 1, wherein the first openings are formed apart from the bypass hole at the lower portion of the outer case along the length direction of the outer case.

6. The heat exchanger of claim 1, wherein the inner case is a cylinder of which both ends are opened.

7. The heat exchanger of claim 1, wherein the second openings are formed apart from each other along the length direction of the inner case.

8. The heat exchanger of claim 7, wherein the second openings are misaligned along the length direction of the inner case.

9. The heat exchanger of claim 1, wherein the inner case is moved upward when the deformable member moves upward so that the second opening is positioned at the first opening to open the first opening and close the bypass hole by the inner case.

10. The heat exchanger of claim 1, wherein the inner case is assembled at the first time as the first opening is closed by the inner case and the second opening is closed by the outer case.

11. The heat exchanger of claim 1, wherein the deformable material filled within the deformable member is wax material that expands or contracts according to the temperature of the operating fluid flowing into the inflow hole.

12. The heat exchanger of claim 1, wherein flowing holes are formed on an exterior circumference of the flange member.

13. The heat exchanger of claim 1, wherein an exterior circumference of the flange member is fixed to the lower interior circumference of the inner case, and a mounting portion formed to a center portion the flange member is connected to the deformable member and is fixed by a fixing ring mounted to the deformable member.

14. The heat exchanger of claim 1, wherein the flange member is connected to an interior circumference of the inner case.

15. The heat exchanger of claim 1, wherein at least one penetration hole is formed in the stopper for the operating fluid flowing through the first inflow hole to flow within the valve unit.

16. The heat exchanger of claim 1, wherein a seal ring is disposed between the heat radiating portion and the fixing member of the outer case for the operating fluid flowed within the valve unit not to be leaked out of the heat radiating portion.

17. The heat exchanger of claim 1, wherein the bifurcating portion protrudes from the heat radiating portion for connecting the first inflow hole and the first exhaust hole.

18. The heat exchanger of claim 1, wherein the first inflow hole and the first exhaust hole are formed in corners of the heat radiating portion in diagonal directions.

19. The heat exchanger of claim 1, wherein the second inflow hole and the second exhaust hole are formed in the second surface of the heat radiating portion facing diagonally with each other and symmetrical with respect to the first inflow hole and the first exhaust hole.

20. The heat exchanger of claim 1, wherein one of operating fluid is a coolant circulating through a radiator and the other operating fluid is a transmission oil circulating through an automatic transmission.

21. The heat exchanger of claim 20, wherein the coolant circulates through the first inflow hole and the first exhaust hole, and the transmission oil circulates through the second inflow hole and the second exhaust hole, and the connecting line includes a first connecting line through which the coolant flows, and a second connecting line through which the transmission oil flows.

22. The heat exchanger of claim 21, wherein the bifurcating portion includes a bypass line positioned adjacent the first inflow hole and the first exhaust hole and adapted to discharge the coolant flowing into the first inflow hole to the first exhaust hole in addition to the first connecting line.

* * * * *